United States Patent [19]

Stimler

[11] 4,155,065

[45] May 15, 1979

[54] OPTIC SCATTERING ACOUSTIC TRANSDUCER

[75] Inventor: Morton Stimler, Rockville, Md.

[73] Assignee: The United States of America as represented by the Secretary of the Navy, Washington, D.C.

[21] Appl. No.: 832,264

[22] Filed: Sep. 12, 1977

[51] Int. Cl.² ............................ G01V 1/16; H04R 1/44
[52] U.S. Cl. ............................... 340/8 LF; 340/13 R; 340/14; 181/122; 73/653
[58] Field of Search ................ 340/2, 4 FT, 4 R, 8 R, 340/13 R, 14, 8 LF; 73/653, 657; 250/231 P; 181/122

[56] References Cited

U.S. PATENT DOCUMENTS

| | | | |
|---|---|---|---|
| 241,909 | 5/1881 | Ball et al. | 250/199 |
| 3,278,753 | 10/1966 | Pitts et al. | 340/4 R |
| 3,469,107 | 9/1969 | Townes et al. | 340/4 R |
| 3,471,238 | 10/1969 | Hawke | 73/657 |
| 3,474,253 | 10/1969 | Ressler | 340/13 R |
| 3,611,277 | 10/1971 | Yoder | 340/14 |
| 3,728,549 | 4/1973 | Sachs | 340/4 R |
| 3,831,137 | 8/1974 | Cuomo | 340/8 R |
| 3,891,859 | 6/1975 | Funk | 340/4 R |
| 3,903,496 | 9/1975 | Stimler | 340/8 R |

OTHER PUBLICATIONS

Teodorescu, "Linear Displacement Sensor Uses Liquid Crystal Cell", 8/75, p. 9, Electronic Engineering, vol. 47, #570.

*Primary Examiner*—Nelson Moskowitz
*Attorney, Agent, or Firm*—R. S. Sciascia; A. L. Branning; R. E. Bushnell

[57] ABSTRACT

An omnidirectional hydrophone using particles suspended in a liquid acoustically coupled to a conducting environment for detecting acoustic waves by providing scattering of internally generated electromagnetic radiation from particles driven by the acoustic waves.

54 Claims, 2 Drawing Figures

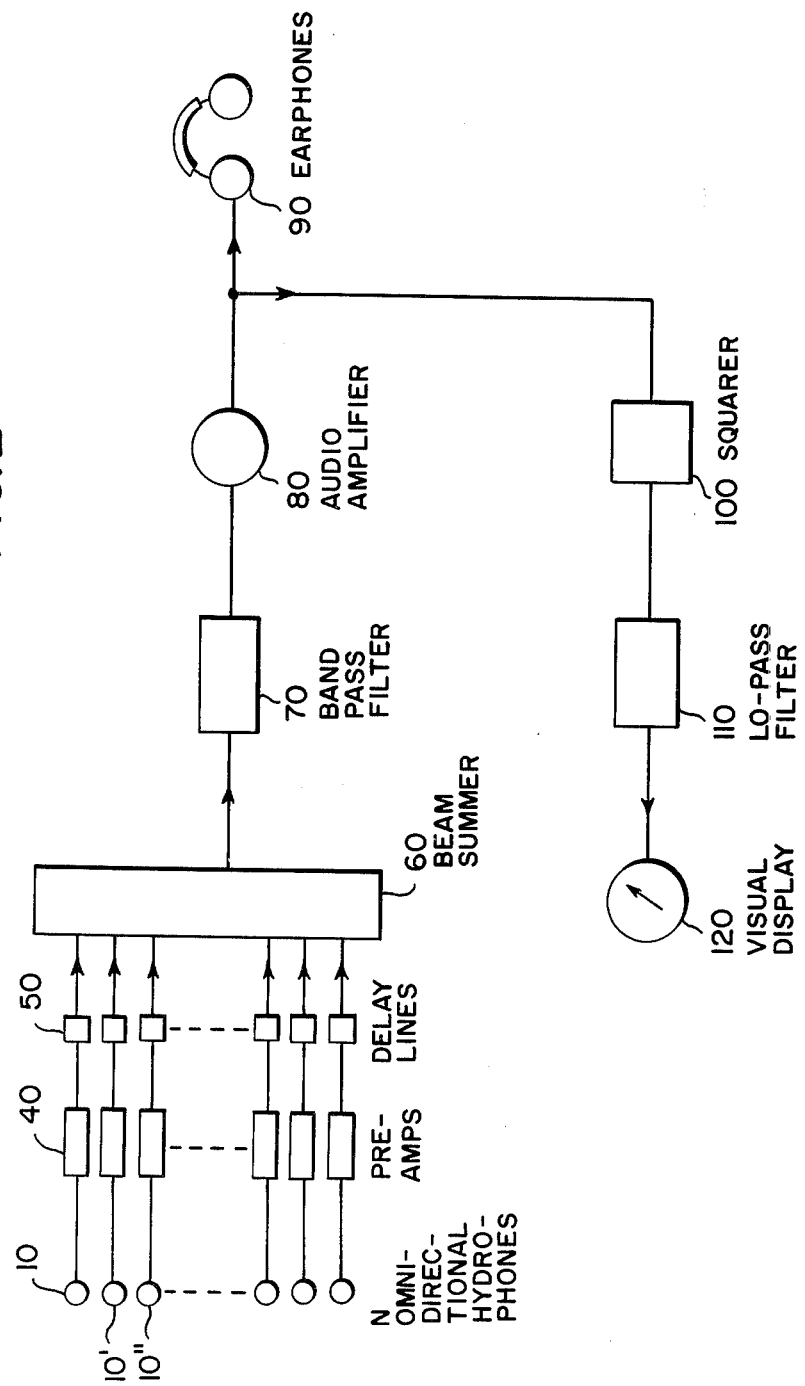

OPTIC SCATTERING ACOUSTIC TRANSDUCER

BACKGROUND

The present invention relates to the detection of acoustic signals and, more particularly, to the use of scattering to modulate electromagnetic energy.

Conventional devices for sensing acoustic waves depended upon direct conversion of the waves into electrical energy via piezoelectric, electrodynamic, or magnetostrictive transducer elements (e.g., U.S. Pat. No. 3,903,497 by M. Stimler and Z. I. Slawsky). Usually signal processing was employed to enhance the signal to noise ratio. With the advent of coherent, monochromatic radiation (e.g., the laser), detection of the effect of acoustic waves upon locally supplied electromagnetic energy has been proposed. Method And Apparatus for Optically Detecting Acoustic Disturbances, U.S. Pat. No. 3,474,253 by B. V. Kessler, an example of one proposal, uses a laser to project a beam of light through the open sea onto a photomultiplier. Coherent, low frequency acoustic disturbances cause Brillouin scattering of the light from the acoustic waves. This has recently been extended to include scattering (either Rayleigh or Mie) from particles present in the sea water which are driven to oscillate at the frequency of the acoustic signal. The open sea however, is a dynamic acoustic conductor. Intrinsic in the signals detected by this and by other examples of the prior art are noise contributions due to such dynamic sources as scattering center (particle) turbulence and the flow of the conducting medium.

As used herein the term "light" is not limited to the visible spectrum but connotes electromagnetic radiation generally, without limitation by bandwidth.

SUMMARY OF THE INVENTION

The present invention provides an omnidirectional transducer prepared with particles suspended in a liquid medium acoustically coupled to the surrounding medium via a compliant acoustic diaphragm. Particles in the system oscillate with the frequency of passing acoustic waves. A beam of coherent electromagnetic radiation is projected into the system. The radiation scattered from the particles is modulated by the oscillation of the particles at the frequency of their oscillation. An electromagnetic sensing element detects the backscatter radiation to give an electrical signal dependent upon the acoustic signal.

Accordingly, it is an object of the present invention to provide a process and an apparatus for sensing acoustic signals.

It is another object of the invention to provide a process and an apparatus for sensing acoustic signals that exhibit an enhanced signal-to-noise ratio.

It is yet another object to provide a novel transducer.

It is still yet another object to provide a novel method of transducing incident acoustic energy.

It is still another object to provide an omnidirectional hydrophone.

It is a further object to provide a transducer deployable in a dynamic and acoustically conducting medium that provides a signal undistorted by dynamic noise occurring within the medium.

It is still a further object to provide a hydrophone deployable in the open sea that is able to detect the acoustic signatures of vessels undistorted by scattering center turbulence and relative flow of the sea.

BRIEF DESCRIPTION OF THE DRAWINGS

A more complete appreciation of this invention, and many of the attendant advantages thereof, will be readily appreciated as the same becomes better understood by reference to the following detailed description when considered in conjunction with the accompanying drawings in which like numbers indicate the same or similar components, wherein:

FIG. 2 is a single-line schematic diagram of a passive array sonar system using the transducers shown in FIG. 1.

DETAILED DESCRIPTION

Figure 1:
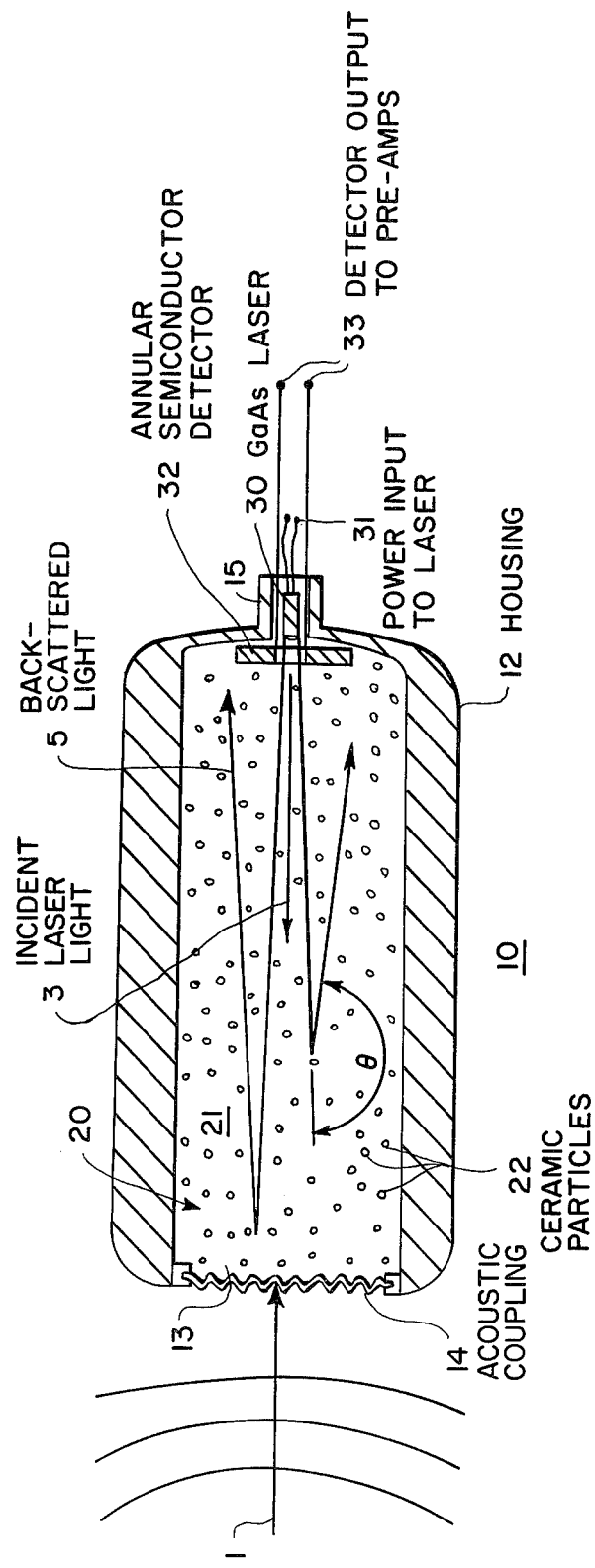
FIG. 1 is a cross-sectional view showing one embodiment of an opto-acoustic transducer fabricated according to the present teachings.

Referring now to the drawings, and in particular to FIG. 1, there is shown a sectional view of a transducer 10 dedicated to the detection of passing acoustic signals in an acoustically conducting medium such as sea water. The transducer housing 12 is constructed with an orifice 13 and an electrical port 15, typically at opposite ends. A system 21 of particles 22 suspended in a liquid 20, for example, powdered ceramic suspended in an emulsion 20, fills the interior of the housing 12. An acoustic diaphragm 14 covers orifice 13 and acoustically couples system 21 with the surrounding environment. A gallium-arsenide laser 30 positioned inside the cavity of rigid housing 12 projects a carrier signal, a coherent, monochromatic beam of electromagnetic radiation 3 into the emulsion, preferably at a normal to the surface of acoustic diaphragm 14. Passing acoustic waves 1 (i.e., pressure variations occuring at an acoustic frequency) drive compliant diagragm 14 which acoustically couples the surrounding medium with the system 21. Particles 22 in the system 21 oscillate at the frequency of the impingent acoustic waves 1. The presence of particles 22 produces backscatter 5 of the incident light beam 3. The oscillation of particles 22 modulates the backscatter at the frequency of the impingent acoustic waves 1. An annular semiconductor detector 32 (e.g., a photoconductor or a photovoltaic cell) prepared to exhibit peak responsivity over a spectral region including the frequency of the backscatter 5, transposes the modulated backscatter into a modulated electrical signal. The electrical signal is carried via cables 33 to the preamplifier 40 and associated circuitry shown in the single-line schematic diagram of FIG. 2. Power to the light source is carried via cables 31 through electrical port 15.

Acoustic coupling 14 is a compliant diaphragm of a rubber material such as neoprene or a plastic material such as polyethelene. It may be either sealed in the orifice 13 of housing 12 or removably installed with a ring clamp. The device is pressure compensated for the intended depth by any conventional technique, for example, by using a diaphragm of sufficient thickness to withstand the expected pressure.

The monochromatic, coherent light beam is projected through the interior of the housing collinear to the propagation path of the acoustic waves 2 through the particle system 21. The intensity, I, of the scattered components is dependent upon the size of particles 22 the system 20 in relation to the wavelength of incident radiation. As described in *Light Scattering By Small Particles*, by H. C. VandeHulst, J. Wiley and Sons (1957), $$I = KI_o G(u)(1 + \cos^2\theta) \quad (1)$$

where:

$I_o$ is the intensity of incident radiation;

$\theta$ is the angle of observation, approximately 180 degrees in FIG. 1; and,

K is a constant of proportionality containing the wavelength of the incident light, the particle radius, the optical index of refraction of the medium, and the distance of observation.

The scattering of the incident radiation will take place over a large range of particle sizes. These may range from much smaller than the wavelength of the incident radiation to much larger than that wavelength. An optimum size may be calculated. The function G(u) in equation (1) is proportional to the Bessel function $J_{3/2}(u)$ and the argument u of the Bessel function is given by, $$u = (4\pi a/\lambda) \sin(\theta/2) \quad (2)$$

where:

a is the radius of the scattering particles;

and, $\lambda$ is the incident wavelength.

At the observation angle shown in FIG. 1, $\theta$ is approximately equal to 180 degrees. Equation (1) shows that this corresponds to a condition for near maximum backscatter intensity since the factor $(1+\cos^2\theta) \simeq 2$. As a maximum value of $J_{3/2}(u)$ gives the factor G(u) a maximum value, the optimum particle size is found by solving the equation for the first derivative of $J_{3/2}$, $$J'_{3/2}(u) = 0. \quad (3)$$

A table of Bessel functions, *Handbook of Mathematical Functions With Formulas, graphs and Mathematical Tables*, M. Abramowitz and J. A. Stegun, National Bureau of Standards Applied Mathematics Series 55, at 468 (1965), shows the first maximum of $J_{3/2}(u)$ occurs at:

$$u = (4\pi a/\lambda) \sin(\theta/2) = 2.46. \quad (4)$$

At the backscattering angle, 180°, with incident radiation generated by a gallium-arsenide laser, GaAs, $\lambda \simeq 60$ microns projected, into a particle system with an optical index of refraction of about 1.5, the optimum particle radius is found from Eq. (4) on the order of:

$$a = 1.2 \text{ microns}. \quad (5)$$

Such particle sizes are easily obtained in a powdered ceramic form. The number density of the particles suspended in the system is a controllable feature. The acoustic index of refraction of the system over the acoustic spectrum could reduce the velocity of propagation of impingent waves through the system to between one-half to two-thirds of their speed in the surrounding medium, although the transducer will function with a system 21 identical in composition to that of the surrounding medium (e.g., a sea water 21 in a transducer deployed in the open sea or river water in a transducer deployed in a river). Preferably, the system is a turbid suspension, that is, an intimate mixture in which solid particles of 0.25 microns diameter or larger is are uniformily distributed in a finely divided state through a liquid or gaseous dispersion medium. It is the purity and uniformity of the optical properties and, as the following illustrative example suggests, not the physical properties of the discrete components, that are determinative of one's success in practicing the present invention.

EXAMPLE

A system of particles with acceptable solubility and stability characteristics over the temperature ranges encountered in a typical open sea deployment of the transducer may be prepared from a dispersing medium (an emulsion) of a saturated fatty acid soap such as potassium-stearate or sodium-decylsulfonate containing polystyrene or polymethylmetacrylate. Particle sizes may be on the order of one micron in diameter. Other examples of dispersion media may be found in volume 5 of *The Encyclopedia of Polymer Science And Technology*, pp. 801 through 859.

It is apparent from the details of the foregoing description that the transducer disclosed relies upon scattering in a selfcontained medium of propagation to provide a greater signal-to-noise ratio in a dynamic surrounding medium than that given by prior art devices. In the disclosed transducer, the attenuation of the carrier signal is a known constant, independent of the vagaries of the surrounding medium (e.g., diurnal and synoptic variations in the temperature of open sea water). The contained medium is isolated from acoustic noise caused by turbulence and relative flow present in the surrounding medium. Similarly, the contained medium prevents spurious modulation of the carrier signal arising from the oscillating motion of heterogeneous materials accompanying the suspended particles such as plankton in sea water. By controlling the mechanical resonance, the transducer may be designed to act as a band pass filter.

It will be considered therefore, that all those changes and modifications which fall fairly within the scope of the invention shall be a part thereof. While the particles have been variously described as ceramic, polystyrene, or polymethylmethacrylate, any solid particles such as latex, are satisfactory. For example, finely divided clay forms a colloidal suspension—is peptized—in water when treated with ammonium hydroxide or with tannin. Additionally, the system may be a colloidal or a suspension as well as an emulsion prepared from a microscopically heterogeneous mixture of two phases, both of which are liquid at the temperature of the surrounding medium, such as oil and water, and in which one liquid forms minute droplets suspended in the other. An emulsifier such as ammonium linoleate, may be used to make the emulsion more stable. A mechanical stirring mechanism, or an applied electro-magnetic field may be incorporated into the design of the transducer in order to create a homogeneous system.

What is claimed and desired to be secured by a Letters Patent of the United States is:

1. A transducer deployable in an acoustically conducting medium, comprising:

a closed particle system discrete from the conducting medium; compliant diaphragm for acoustically coupling the particle system with the conducting medium;

a source projecting a coherent beam of electromagnetic radiation into the system; and, a detector sensitive to backscatter of the coherent beam.

2. The transducer set forth in claim 1 wherein the system is a dispersion of particles not less then 0.25 microns in diameter.

3. The transducer set forth in claim 1 wherein said means comprises a compliant diaphragm having opposed surfaces in contact with a different one of the medium and the system.

4. The transducer set forth in claim 3 wherein the beam is normal to the diaphragm.

5. The transducer set forth in claim 4 wherein the detector is sensitive to backscatter occurring within one degree of an 180° angle of observation.

6. A transducer deployable in a dynamic acoustically conducting medium, comprising:
coupling means exposed to the conducting medium;
a closed particle system limiting the speed of propagation of acoustic waves to a value less than the speed of propagation of acoustic waves in the conducting medium, acoustically coupled to the medium only via the coupling means;
a source projecting a beam of coherent electromagnetic radiation into the system; and
a detector responsive to backscatter of the beam.

7. The transducer set forth in claim 6 wherein the system is a dispersion of particles not less than 0.25 microns in diameter.

8. The transducer set forth in claim 6 wherein the system is comprised of of particles having diameters within one order of magnitude of one micron.

9. The transducer set forth in claim 6 wherein the coupling means defines a plane and the beam is normal to the plane.

10. The transducer set forth in claim 1 wherein the particle system restricts the speed of acoustic waves in the system to a value less than the speed of acoustic waves in the conducting medium.

11. The transducer set forth in claim 9 wherein the detector is positioned to respond to backscatter occurring within one degree of an 180° angle of observation.

12. The transducer set forth in claim 11 wherein the beam is comprised of monochromatic light.

13. The transducer set forth in claim 1 wherein the particle system is comprised of sea water with a colloid of particles having diameters less than ten microns.

14. The transducer set forth in claim 6 wherein the particle system restricts the speed of acoustic waves in the system to between one-half and two-thirds of the speed of acoustic waves in the medium.

15. The transducer set forth in claim 11 wherein the detector comprises at least one photovoltaic cell.

16. A transducer deployable in an acoustically conducting medium for providing response to passing acoustic waves, comprising:
a housing having an orifice opening into an interior cavity;
a closed particle system filling the cavity;
the particle system limiting the speed of propagation of acoustic waves to a value less than the speed of propagation of acoustic waves in the conducting medium;
an acoustic coupling at the orifice separating a liquid phase of the conducting medium from the system;
a source in the cavity projecting a coherent beam of electromagnetic radiation; and
detector means responsive to backscatter of the beam.

17. The transducer set forth in claim 1 wherein the particle system is a dispersion of particles not less than 0.25 microns in diameter.

18. The transducer set forth in claim 16 wherein the system is comprised of particles having diameters within one order of magnitude of one micron.

19. The transducer set forth in claim 16 wherein the source is positioned opposite the acoustic coupling.

20. The transducer set forth in claim 16 wherein the acoustic coupling defines a plane having opposed surfaces exposed to the medium and the system, and the beam is normal to the plane.

21. The transducer set forth in claim 20 wherein the particle system is comprised of particles having diameters of about 1.2 microns.

22. The transducer set forth in claim 1 wherein the particle system is comprised of sea water.

23. The transducer set forth in claim 16 wherein the particle system is comprised of a colloid of particles having diameters less than ten microns.

24. The transducer set forth in claim 16 wherein the particle system restricts the speed of acoustic waves in the system to between one-half and two-thirds of the speed of the passing acoustic waves.

25. The transducer set forth in claim 16 wherein particles in the particle system are selected from the group consisting of ceramic, polystyrene, polymethylmethacrylate, latex, or clay.

26. The transducer set forth in claim 16 wherein the particle system is comprised of an emulsion of immiscible liquids.

27. The transducer set forth in claim 16 wherein the particle system comprises a mixture of solid particles uniformly distributed in a dispersion medium, the system having an index of refraction greater than the index of refraction of the conducting medium.

28. The transducer set forth in claim 6 wherein the particle system comprises a mixture of solid particles uniformly distributed in a dispersion medium, the system having an index of refraction greater than the index of refraction of the conducting medium.

29. The transducer set forth in claim 16 wherein the detector comprises at least one photovoltaic cell.

30. The transducer set forth in claim 6 wherein the particle system propagates acoustic waves impingent upon the acoustic coupling, as transverse waves having velocities of propagation between one-half and two-thirds of the velocities of progagation of the acoustic waves.

31. The transducer set forth in claim 16 wherein the particle system propagates acoustic waves impingent upon the acoustic coupling, as transverse waves having velocities of propagation between one-half and two-thirds of the velocities of propagation of the passing acoustic waves.

32. The transducer set forth in claim 1, wherein the closed particle system comprises a mixture of solid particles uniformly distributed in a dispersion medium, the system having an index of refraction greater than the index of refraction of the conducting medium.

33. The transducer set forth in claim 1, wherein the particle system has an index of refraction greater than the index of refraction of the conducting medium.

34. The transducer set forth in claim 33 wherein the particle system is a dispersion of particles not less than 0.25 microns in diameter.

35. The transducer set forth in claim 1, wherein the particle system propagates acoustic waves impingent upon the means for acoustically coupling, as transverse waves having velocities of propagation between one-half and two-thirds of the velocities of propagation of the impingent acoustic waves.

36. A transducer deployable in an acoustically conducting medium, comprising:
a rigid container;

a particle system having an index of refraction greater than the index of refraction of the conducting medium;

a complient diaphragm for enclosing the particle system within the rigid container;

the particle system being acoustically coupled to the conducting medium only via the a complient diaphragm;

a source projecting a beam of coherent electromagnetic radiation into the particle system; and a detector responsive to backscatter of the beam.

37. A transducer deployed in a dynamic acoustically conducting medium comprising:

coupling means defining a plane, exposed to the medium;

a particle system where the speed of acoustic waves is between one-half and two-thirds of speed of acoustic waves in the medium, acoustically coupled to the medium only via the coupling means;

a source of coherent electromagnetic radiation projecting a beam normal to the plane into the system; and a detector responsive to backscatter of the beam occurring within one degree of an 180° angle of observation.

38. The transducer set forth in claim 37 wherein the particle system is comprised of a colloid of particles having diameters less than ten microns.

39. The transducer set forth in claim 37 wherein the particle system is comprised of a dispersion of particles not less than 0.25 microns in diameter.

40. The transducer set forth in claim 37 wherein the particle system is comprised of an emulsion of immiscible liquids.

41. The transducer set forth in claim 37 wherein particles in the particle system are selected from the group consisting of ceramic, polystyrene, polymethylmethacrylate, latex, or clay.

42. The transducer set forth in claim 37 wherein the particle system comprises a dispersion medium, the system having an index of refraction greater than the index of refraction of the conducting medium.

43. A transducer deployable in an acoustically conducting medium for providing response to passing acoustic waves, comprising:

a housing having an orifice opening into an interior cavity;

a particle system filling the cavity;

the particle system limiting the speed of acoustic waves in the system to between one-half and two-thirds of the speed of the passing acoustic waves;

an acoustic coupling at the orifice separating the conducting medium from the particle system;

a source in the cavity projecting a coherent beam of electromagnetic radiation; and detector means repsonsive to backscatter of the beam.

44. The transducer set forth in claim 43 wherein the particle system is comprised of a colloid of particles having diameters less than ten microns.

45. The transducer set forth in claim 43 wherein the particle system is comprised of a dispersion of particles not less than 0.25 microns in diameter.

46. The transducer set forth in claim 43 wherein the particle system is comprised of an emulsion of immiscible liquids.

47. The transducer set forth in claim 43 wherein particles in the particle system are selected from the group consisting of ceramic, polystyrene, polymethylmethacrylate, latex, or clay.

48. The transducer set forth in claim 43 wherein the particle system comprises a dispersion medium, the system having an index of refraction greater than the index of refraction of the conducting medium.

49. A transducer deployable in an acoustically conducting medium for providing response to passing acoustic waves, comprising:

a housing having an orifice opening into an interior cavity;

a particle system filling the cavity;

an acoustic coupling at the orifice separating the conducting medium from the particle system;

the particle system propagating passing acoustic waves impingent upon the acoustic coupling, as transverse waves having velocities of propagation between one-half and two-thirds of the velocities of propagation of the passing acoustic waves;

a source in the cavity projecting a coherent beam of electromagnetic radiation; and detector means responsive to backscatter of the beam.

50. The transducer set forth in claim 49 wherein the particle system is comprised of a colloid of particles having diameters less than ten microns.

51. The transducer set forth in claim 49 wherein the particle system is comprised of a dispersion of particles not less than 0.25 microns in diameter.

52. The transducer set forth in claim 49 wherein the particle system is comprised of an emulsion of immiscible liquids.

53. The transducer set forth in claim 49 wherein particles in the particle system are selected from the group consisting of ceramic, polystyrene, polymethylmethacrylate, latex, or clay.

54. The transducer set forth in claim 49 wherein the particle system comprises a dispersion medium, the system having an index of refraction greater than the index of refraction of the conducting medium.

* * * * *